US009038092B2

(12) United States Patent
Goupil

(10) Patent No.: US 9,038,092 B2
(45) Date of Patent: May 19, 2015

(54) BROWSER WINDOW FRAME-TO-FRAME COMMUNICATION

(71) Applicant: Microsoft Corporation, Redmond, WA (US)

(72) Inventor: Jean-Sébastien Goupil, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 13/787,468

(22) Filed: Mar. 6, 2013

(65) Prior Publication Data

US 2014/0259027 A1    Sep. 11, 2014

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ........................................ G06F 9/54 (2013.01)

(58) Field of Classification Search
None
See application file for complete search history.

(56) References Cited

U.S. PATENT DOCUMENTS

| | | | |
|---|---|---|---|
| 8,250,082 | B2 | 8/2012 | Gwozdz et al. |
| 8,316,078 | B2 | 11/2012 | Appleton et al. |
| 2008/0086736 | A1* | 4/2008 | Timmons ...................... 719/314 |
| 2012/0317238 | A1 | 12/2012 | Beard |
| 2012/0331481 | A1* | 12/2012 | Faludi ........................... 719/313 |

OTHER PUBLICATIONS

Hanov, Steve, "Cross-domain communication the HTML5 way", Published on: Nov. 25, 2010, Available at: http://stevehanov.ca/blog/index.php?id=109.
Auberger, Georges, "Secure Cross Domain iFrame Communication", Published on: Mar. 27, 2011, Available at: http://ternarylabs.com/2011/03/27/secure-cross-domain-iframe-communication/.
Jiaye, Wang, "Improve Cross-Domain Communication with Client-Side Solutions", Published on: Jun. 28, 2011, Available at: http://www.ibm.com/developerworks/web/library/wa-crossdomaincomm/.

(Continued)

Primary Examiner — H S Sough
Assistant Examiner — Craig Dorais
(74) Attorney, Agent, or Firm — Jim Banowsky; Leonard Smith; Micky Minhas

(57) ABSTRACT

Communication facilitated between frames of a browser window. Whenever a particular frame receives a message destined for a target frame from a source frame, the particular frame determines if the particular is indeed the target frame. If so, the particular frame processes the message, but if not, the particular frame determines whether the target frame has registered with the particular frame. If the target frame has registered with the particular frame, the particular frame uses a handle communicated as part of the registration to dispatch the message further towards the target frame. In some cases, this handle may be directly that of the target frame itself, in which case the particular frame communicates the message directly with the target frame. This manner of inter-frame communication may be facilitated by a unique registration process when frames come into existence.

20 Claims, 9 Drawing Sheets

(56) References Cited

OTHER PUBLICATIONS

Mahemoff, "Software as She's Developed", Published on: Mar. 3, 2008, Available at: http://softwareas.com/cross-domain-communication-with-iframes.

"Internet Explorer 7 bBlocks Cross-Domain Iframe to Parent Communication", Published on: Mar. 17, 2008, Available at: http://thedesignspace.net/MT2archives/000472.html#.URMxxPKuk24.

* cited by examiner

US 9,038,092 B2

BROWSER WINDOW FRAME-TO-FRAME COMMUNICATION

BACKGROUND

A browser is capable of rendering a browser window (such as a web page) in response to receiving markup language and associated files, such as graphics, video, and executable files. A browser window often includes multiple frames, where each frame might display some content that may be populated independent of the remainder of the frames in the browser window. Typically, the frames are hierarchically structured such that the root frame is the entire scope of the browser window itself. The browser window may include one or more frames that represent children frames of the root frame. Those children frames may have their own children frames contained within their respective boundaries, and so forth.

Often, it is possible for the frames of a single browser window to be included within different security domains. For example, perhaps all but one frame is controlled by the publisher of the browser window, but that publisher allows a third party to publish content within one of the frames. In that case, the third-party frame may be in a different security domain than the remainder of the frames. Frames within one domain cannot easily communicate with frames in another domain, except through a controlled interface. This restriction provides security to the communication process, but the controlled interface can be difficult to implement. Furthermore, it is difficult and probably not conventionally possible for a child frame of a parent frame to communicate with another child frame of the parent frame using current technology.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

In accordance with at least one embodiment described herein, communication is facilitated between frames of a browser window. Whenever a particular frame receives a message destined for a target frame from a source frame, the particular frame determines if the particular frame is indeed the target frame. If so, the particular frame processes the message, but if not, the particular frame determines whether the target frame has registered with the particular frame. If the target frame has registered with the particular frame, the particular frame uses a handle communicated as part of the registration to dispatch the message further towards the target frame. In some cases, this handle may be directly that of the target frame itself, in which case the particular frame communicates the message directly with the target frame. In other cases, this handle may be a frame that relayed the registration request of the target frame, in which case the particular frame communicates the message first to the frame that relayed the registration request of the target frame.

This manner of inter-frame communication may be facilitated by a unique registration process when frames come into existence. For instance, the particular frame acquires a parent handle that may be used to communicate with a parent frame of the particular frame. The particular frame registers with the parent frame by providing registration information including a name of the particular frame. In addition, the registration information might also include an origin of the particular frame that correlates to the name of the particular frame. The origin may be used by the parent frame to verify future registration from the particular frame to the parent frame. If the particular frame generates a child frame, the particular frame response to the registration request from a child frame by recording a name of the child frame, and registering the name of the child frame with the parent frame. This registration occurs in a manner that the handle of the particular frame is associated with the registration of the name of the child frame at the parent frame. This means that when the parent frame dispatches messages towards the child frame, the parent frame dispatches the message to the particular frame.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, communication is facilitated between frames of a browser window. Whenever a particular frame receives a message destined for a target frame from a source frame, the particular frame determines if the particular is indeed the target frame. If so, the particular frame processes the message, but if not, the particular frame determines whether the target frame has registered with the particular frame. If the target frame has registered with the particular frame, the particular frame uses a handle communicated as part of the registration to dispatch the message further towards the target frame. In some cases, this handle may be directly that of the target frame itself, in which case the particular frame communicates the message directly with the target frame. This manner of inter-frame communication may be facilitated by a unique registration process when frames come into existence. Some introductory discussion of a computing system will be described with respect to FIG. 1. Then, the principles of inter-frame communication between frames in a browser window will be described with respect to FIGS. 2 through 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
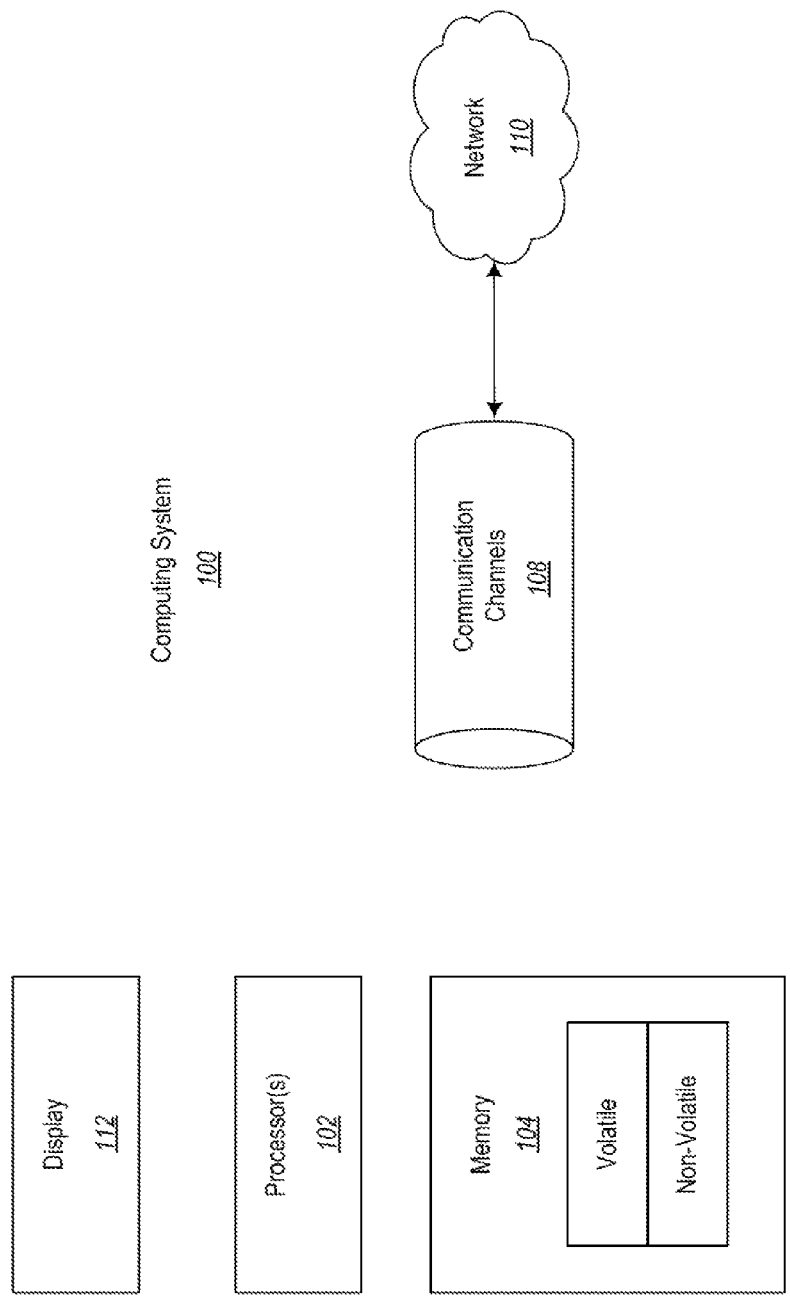
FIG. 1 abstractly illustrates a computing system in which some embodiments described herein may be employed.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well. The computing system also may include a display 112 for displaying content such as, for example, the browser windows with frames that are described herein.

As used herein, the term "executable module" or "executable component" can refer to software objects, routings, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
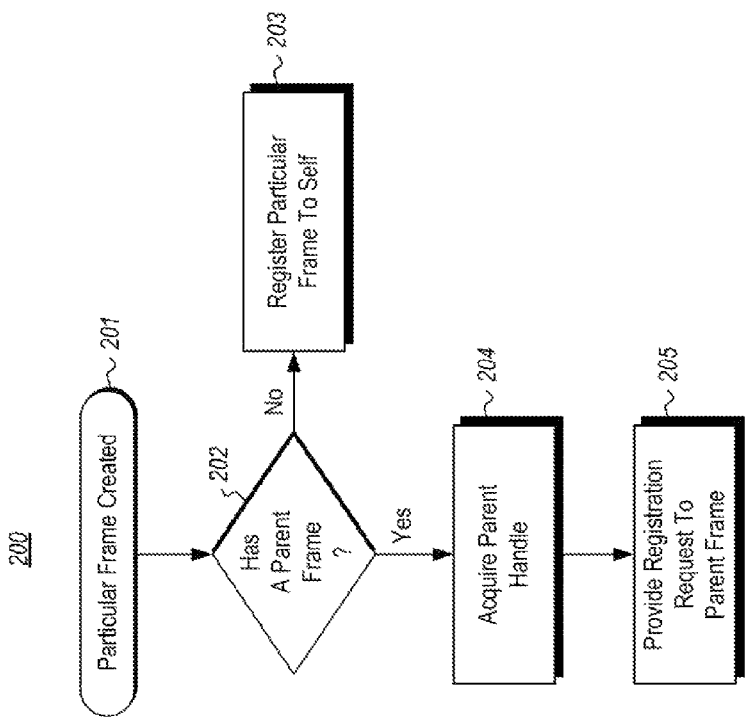
FIG. 2 illustrates a flowchart of a method for a particular frame of a browser window direct registering to a parent frame (or to itself) after being created.
Figure 3:
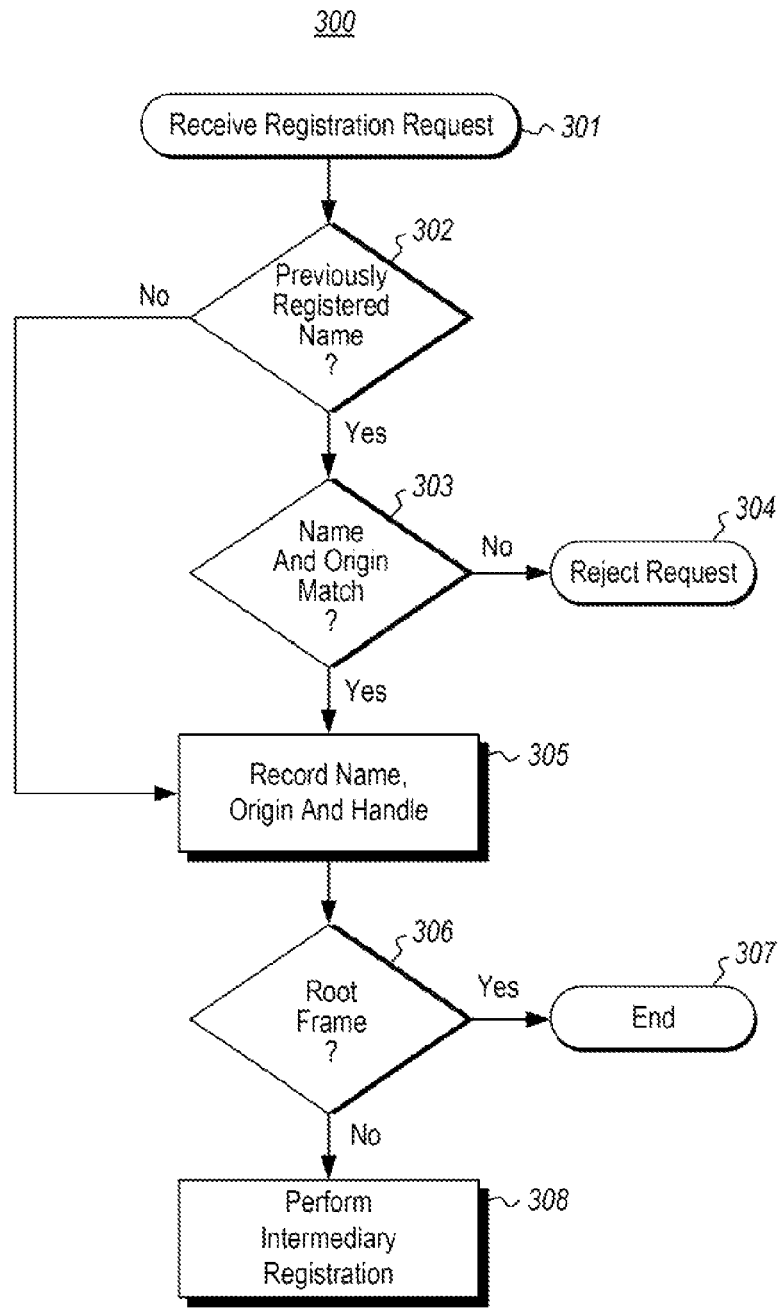
FIG. 3 illustrates a flowchart of a method for a particular frame of the browser window responding to a direct or intermediary registration request from a child frame.

FIG. 2 illustrates a flowchart of a method 200 for a particular frame of a browser window registering to a parent frame (or to itself) after being created. FIGS. 4A through 4E illustrate a walkthrough of a registration process involving a more complicated hierarchy of frames of a browser window. To clarify the method 200 of FIG. 2, the walkthrough of FIGS. 4A through 4E will now be described with respect to the method 200 of FIG. 2, and in some cases also with respect to FIG. 3. The presence of FIG. 2 and FIG. 3 represents an example of a browser window construction mechanism for using the one or more processors to construct a representation of a browser window in a storage/memory hierarchy.

Figure 4A:
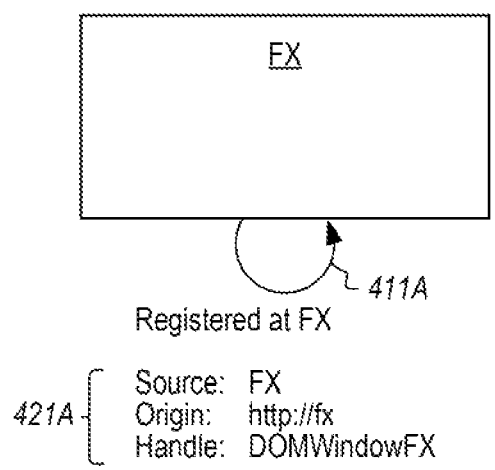
FIG. 4A shows an environment in which a first of five frames, a root frame FX, is created and registered.

In FIG. 4A, the environment 400A shows that a root frame FX is created. The root frame is the parent frame of the entire browser window. Referencing FIG. 2, the method 200 is initiated upon a particular frame being created (initiating event 201). At this point, the "particular frame" would be the root frame 401 since its creation initiated the method 200.

The method 200 then inquires as to whether the particular frame has a parent frame (decision block 202). In this case, the root frame FX does not have a parent frame ("No" in decision block 202), in which case the particular frame registers with itself (act 203). This self-registration is represented by arrow 411A in FIG. 4A. Brackets 421A represent an example of the registration information and includes a unique identifier (which is also referred to herein as a "name" or a "source") of "FX". For security, the registration information 421A might also include an origin of the particular frame that correlates to the name of the particular frame. For instance, registration information 421A shows an origin of "hxxp://fx". Note that "hxxp" is used in the text of this application, rather than "http". This is so that automatic hyperlinking of the published copy of this patent application does not occur. The registration information 421A also includes a handle such as "DOMWindowFX" that may be used to communicate with the root frame FX. In the case of the root frame FX, this completes registration.

Figure 4B:
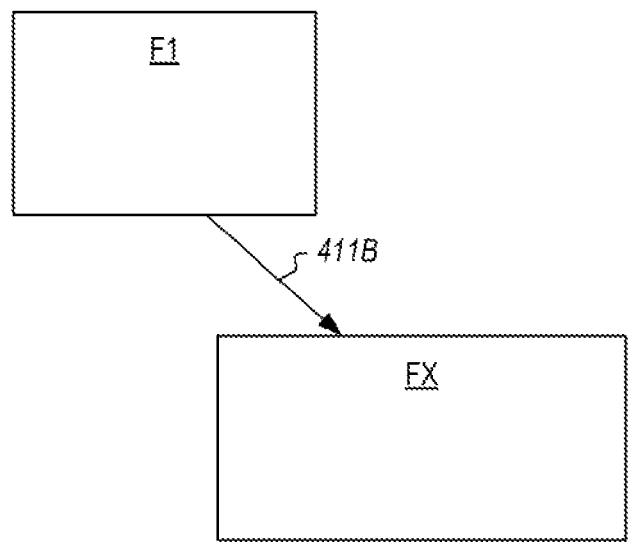
FIG. 4B shows an environment in which a second of five frames, a child frame F1 of the root frame FX, is created and registered.

In FIG. 4B, the environment 400B shows that a child frame F1 is created. Referencing FIG. 2, the method 200 is initiated with frame F1 being created (initiating event 201) and being the particular frame subject to method 200. In this case, the frame F1 does have a parent frame ("Yes" in decision block 202), and thus the frame F1 acquires a parent handle that may be used by the frame F1 to communicate with its parent frame FX (act 204). The frame F1 then registers with the parent frame FX by first issuing a registration request 411B and registration information to the parent frame FX (act 205). As illustrated in FIG. 4B, the registration information 421B includes the name of the frame F1 (i.e., F1) and the origin of the frame F1 (i.e., hxxp://f1). The handle of the frame F1 (i.e., DOMWindowF1) is also shown as being included within registration information 421B, although this handle might have been acquired by the parent frame FX outside of the registration, perhaps when the child frame F1 was created.

FIG. 3 illustrates a flowchart of a method 300 for a particular frame of the browser window responding to a registration request from a child frame. The method 300 may be performed in FIG. 4B in response to a particular frame receiving a registration request from a child frame (initiating event 301). In the case of FIG. 4B and method 300, the particular frame would be the parent frame FX and the child frame would be the child frame F1.

In response to the parent frame FX receiving the registration request 411B from the child frame F1 (initiating event 301), process flow branches depending on whether the name within the registration request 411B is that of a name previously registered by the parent frame FX (decision block 302). Thus, processing proceed on the "No" branch of decision block 302.

Accordingly, the parent frame FX records the name, origin and handle of the child frame F1 (act 305). This is illustrated by registration information 421B including the source name F1, the origin hxxp://f1, and the handle DOMWindowF1. If a frame purporting to be frame F1 ever registers again in the future with the parent frame FX, the name F1 may again be matched against the origin (see decision block 303). Thus, the use of the name and origin provides security when performing registration.

It is then determined whether the particular frame FX is the root frame of the browser window (decision block 306). In this case, the particular frame FX is the root frame ("Yes" in decision block 306), and thus registration ends (act 307).

Figure 4C:
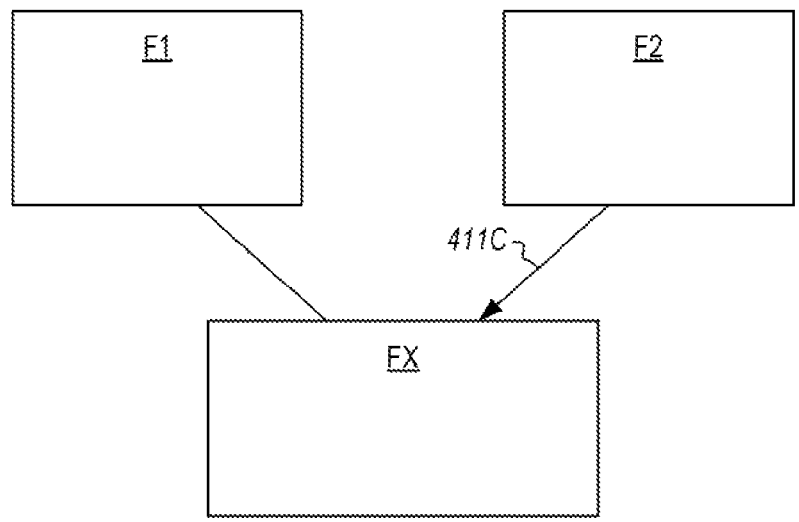
FIG. 4C shows an environment in which a third of five frames, another child frame F2 of the root frame FX, is created and registered.

In FIG. 4C, the environment 400C shows that a child frame F2 is created. The registration process is similar to that of child frame F1. Referencing FIG. 2, the method 200 is initiated with frame F2 being created (initiating event 201) and being the particular frame subject to method 200. The frame F2 does have a parent frame ("Yes" in decision block 202) and thus acquires a parent handle that may be used by the frame F2 to communicate with its parent frame FX (act 204). The frame F2 then registers with the parent frame FX by issuing a registration request 411C and registration information to the parent frame FX (act 205). As illustrated in FIG. 4C, the registration information 421C includes the name of the frame F2 (i.e., F2) and the origin of the frame F2 (i.e., hxxp://f2). The handle of the frame F2 (i.e., DOMWindowF2) is also shown as being included within registration information 421C, although this handle might have been acquired by the parent frame FX outside of the registration, perhaps when the child frame F2 was created.

Referencing FIG. 3 and FIG. 4C, the particular frame performing the operation will be the parent frame FX in response to receiving a registration request from the child frame F2 (initiating event 301). Specifically, the registration request 411C is a direct registration request in that the request 411C is made by the frame F2 and is for registering the same entity, that is the frame F2. In this case, again, the name within the registration request 411C is not that of a name previously registered by the parent frame FX ("No" in decision block 302). Accordingly, the parent frame FX records the name, origin and handle of the child frame F2 (act 305). This is illustrated by registration information 421C including the source name F2, the origin hxxp://f2 and the handle DOMWindowF2.

It is then determined whether the particular frame FX is the root frame of the browser window (decision block 306). In this case, the particular frame FX is the root frame ("Yes" in decision block 306), and thus registration ends (act 307).

Figure 4D:
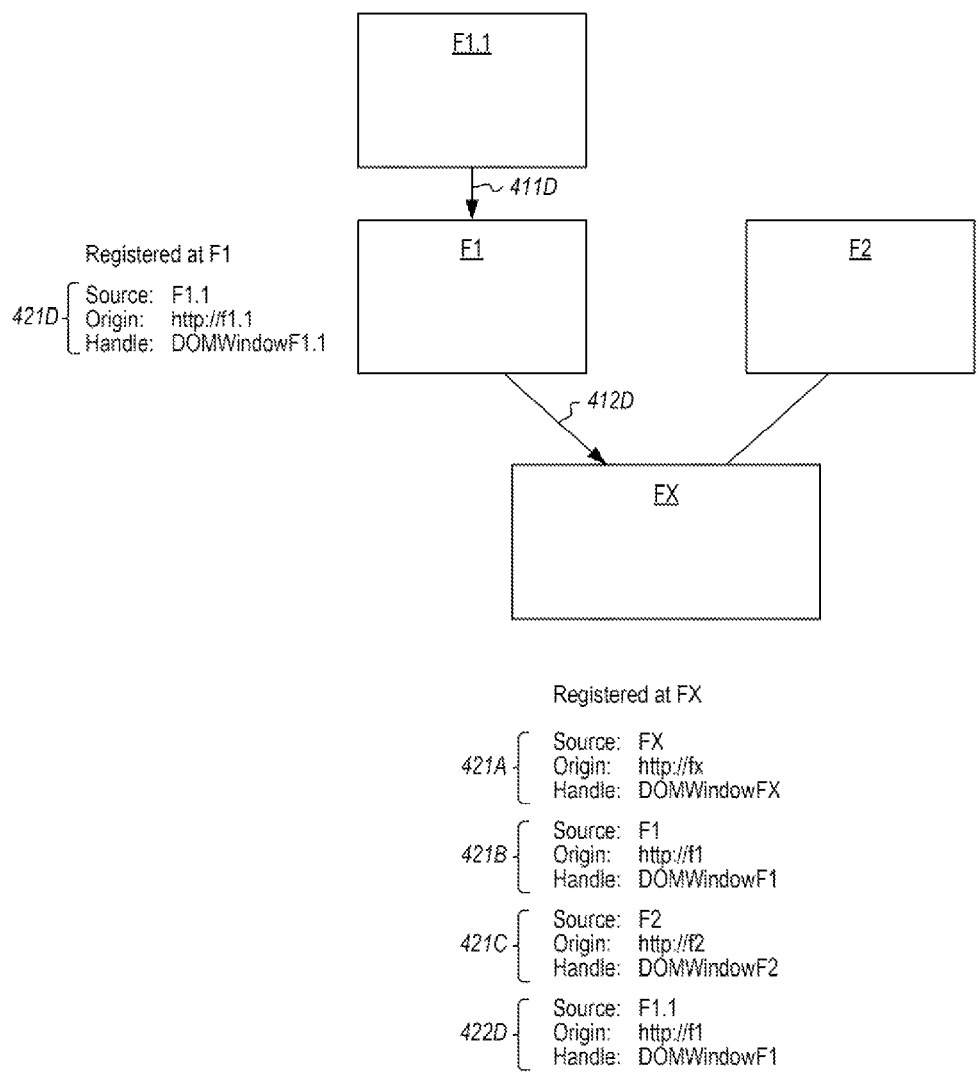
FIG. 4D shows an environment in which a fourth of five frames, a child frame F1.1 of the frame F1, is created and registered.

In FIG. 4D, the environment 400D shows that a child frame F1.1 of the frame F1 is created. Referencing FIG. 2, the method 200 is initiated with frame F1.1 being created (initiating event 201) and being the particular frame subject to method 200. The frame F1.1 does have a parent frame ("Yes" in decision block 202) and thus acquires a parent handle that may be used by the frame F1.1 to communicate with its parent frame F1 (act 204). The frame F1.1 then registers with the parent frame F1 by issuing a registration request 411D and registration information to the parent frame F1 (act 205). As illustrated in FIG. 4D, the registration information 421D includes the name of the frame F1.1 (i.e., F1.1) and the origin of the frame F1.1 (i.e., hxxp://f1.1). The handle of the frame F1.1 (i.e., DOMWindowF1.1) is also shown as being included within registration information 421D, although this handle might have been acquired by the parent frame F1 outside of the registration, perhaps when the child frame F1.1 was created.

Referencing FIG. 3 and registration request 411D of FIG. 4D, the particular frame performing the operation will be the parent frame F1 in response to receiving a registration request from the child frame F1.1 (initiating event 301). Specifically, the registration request 411D is a direct registration request in that the request 411D is made by the frame F1.1 and is for registering the same entity, that is the frame F1.1. In this case, the name within the registration request 411D is not that of a name previously registered by the particular frame F1 ("No" in decision block 302). Accordingly, the parent frame F1 records the name, origin and handle of the child frame F1.1 (act 305). This is illustrated by registration information 421D including the source name F1.1, the origin hxxp://f1.1 and the handle DOMWindowF1.1.

It is then determined whether the particular frame F1 is the root frame of the browser window (decision block 306). In this case, the particular frame F1 is not the root frame ("No" in decision block 306). Accordingly, the particular frame F1 performs intermediary registration of its child frame F1.1 with its parent frame FX (act 308) (see registration request 412D of FIG. 4D). An intermediary registration occurs when the registration requestor is not the same of the entity being registered. In this case, frame F1 issues the registration request 412D, but the registration request 412D is to register frame F1.1, which is different than the registration requestor. In contrast, a direct registration occurs when the registration requestor is the same as the entity being registered. For instance, registration request 411B of FIG. 4B, registration request 411C of FIG. 4C, registration request 411D of FIG. 4D, and registration request 411E of FIG. 4E, are each direct registration requests.

Referencing FIG. 3 and registration request 412D of FIG. 4D, the particular frame performing the operation will be the parent frame FX in response to receiving an intermediary registration request from the child frame F1 (initiating event 301) on behalf of frame F1.1. The registration request 412D includes a name F1.1 that has not been previously registered with the particular frame FX ("No" in decision block 302). The particular frame FX thus records the name of the new frame F1.1 being registered (act 305) and also records the origin and handle of the requesting frame F1 (also act 305). This is illustrated in FIG. 4D by registration information 422D including the source name F1.1, (i.e., the name of the frame being registered), and the origin (i.e., hxxp://f1) and the handle (i.e., DOMWindowF1) of the frame F1 that is requesting the registration be made.

It is then determined whether the particular frame FX is the root frame of the browser window (decision block 306). In this case, the particular frame FX is the root frame ("Yes" in decision block 306), and thus the registration of frame F1.1 is completed (act 307).

Figure 4E:
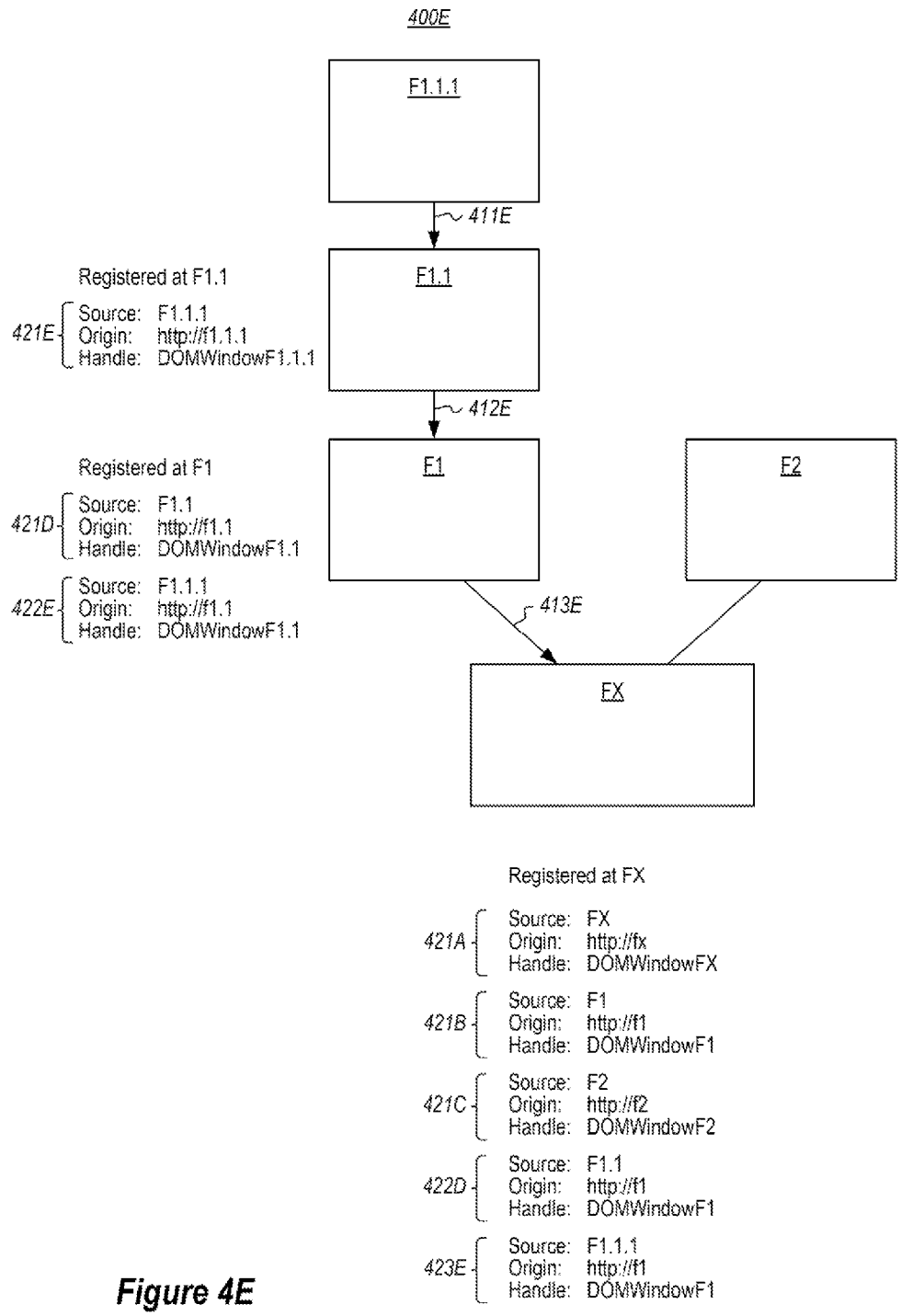
FIG. 4E shows an environment in which a last of five frames, a child frame F1.1.1 of the frame F1.1, is created and registered.

One final registration will be shown with respect to FIG. 4E, although conceptually the registration process may continue to produce any hierarchical structure of frames, however complex.

In FIG. 4E, the environment 400E shows that a child frame F1.1.1 of the frame F1.1 is created. Referencing FIG. 2, the method 200 is initiated with frame F1.1.1 being created (initiating event 201) and being the particular frame subject to method 200. The frame F1.1.1 does have a parent frame ("Yes" in decision block 202) and thus acquires a parent handle that may be used by the frame F1.1.1 to communicate with its parent frame F1.1 (act 204). The frame F1.1.1 then registers with the parent frame F1.1 by issuing a registration request 411E and registration information to the parent frame F1.1 (act 205). As illustrated in FIG. 4E, the registration information 421E includes the name of the frame F1.1.1 (i.e., F1.1.1) and the origin of the frame F1.1.1 (i.e., hxxp://f1.1.1). The handle of the frame F1.1.1 (i.e., DOMWindowF1.1.1) is also shown as being included within registration information 421E, although this handle might have been acquired by the parent frame F1.1 outside of the registration, perhaps when the child frame F1.1.1 was created.

Referencing FIG. 3 and registration request 411E of FIG. 4E, the particular frame performing the operation will be the parent frame F1.1 in response to receiving a registration request from the child frame F1.1.1 (initiating event 301). In this case, the name within the registration request 411E is not that of a name previously registered by the particular frame F1 ("No" in decision block 302). Accordingly, the parent frame F1 records the name, origin and handle of the child frame F1.1.1 (act 305). It is then determined whether the particular frame F1.1 is the root frame of the browser window (decision block 306). In this case, the particular frame F1.1 is not the root frame ("No" in decision block 306). Accordingly, the particular frame F1.1 performs intermediary registration of its child frame F1.1.1 with its parent frame F1 (act 308) (see registration request 412E of FIG. 4D).

Referencing FIG. 3 and registration request 412E of FIG. 4E, the particular frame performing the operation will be the frame F1 in response to receiving an intermediary registration request from the child frame F1.1 (initiating event 301) on behalf of frame F1.1.1. The registration request 412E includes a name F1.1.1 that has not been previously registered with the particular frame F1 ("No" in decision block 302). The particular frame F1 thus records the name of the new frame F1.1.1 being registered (act 305) and also records the origin and handle of the requesting frame F1.1 (also act 305). This is illustrated in FIG. 4E by registration information 422E including the source name F1.1.1 (i.e., the name of the frame being registered), and the origin (i.e., hxxp://f1.1) and the handle (i.e., DOMWindowF1.1) of the frame F1.1 that is requesting the registration be made.

It is then determined whether the particular frame F1 is the root frame of the browser window (decision block 306). In this case, the particular frame F1 is not the root frame ("No" in decision block 306). Accordingly, the particular frame F1 performs intermediary registration of frame F1.1.1 with its parent frame FX (see registration request 413E of FIG. 4D).

Referencing FIG. 3 and registration request 413E of FIG. 4E, the particular frame performing the operation will be the frame FX in response to receiving an intermediary registration request from the child frame F1 (initiating event 301) on behalf of frame F1.1.1. The registration request 413E includes a name F1.1.1 that has not been previously registered with the particular frame FX ("No" in decision block 302). The particular frame FX thus records the name of the new frame F1.1.1 being registered (act 305) and also records the origin and handle of the requesting frame F1 (also act 305). This is illustrated in FIG. 4E by registration information 423E including the source name F1.1.1 (i.e., the name of the frame being registered), and the origin (i.e., hxxp://f1) and the handle (i.e., DOMWindowF1) of the frame F1 that is requesting the registration be made.

It is then determined whether the particular frame FX is the root frame of the browser window (decision block 306). In this case, the particular frame FX is the root frame ("Yes" in decision block 306), and thus the registration of frame F1.1.1 is completed (act 307).

There is further security in the method 300 that will now be described. Until this point, each of the frames FX, F1, F2, F1.1 and F1.1.1 has registered but once up the ancestral chain. In that case, the name of the frame will have been previously registered at each ancestor frame ("Yes" in decision block 302). However, there may be times when the frame re-registers up the ancestral chain. The ancestral frame will then compare the origin with the name of the frame re-registering (decision block 303). If there is not a match ("No" in decision block 304), then there has been a breach of security, and thus the registration is rejected (act 304). If they match the previous name and origin combination ("Yes" in decision block 304), then the name, origin and handle are updated according to the re-registration request (act 305).

This manner of registration makes it possible for any frame of the browser window to securely communicate with any other frame of the browser as a capability that flows from the registration process. This is possible using identical logic within each of the frames. For instance, the logic of the method 500 of FIG. 5 (described below) may be implemented in any of the frames of the environment 400E to allow all frames to communicate.

Figure 5:
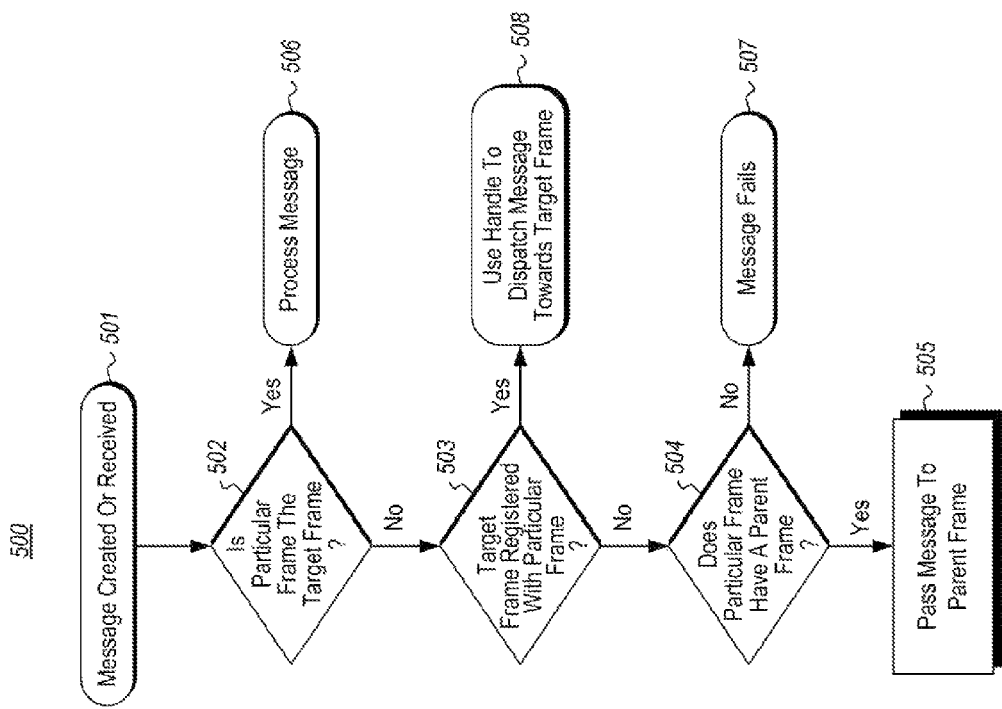
FIG. 5 illustrates a flowchart of a method for facilitating inter-frame communication, which method is initiated by and whenever any particular frame of the browser window receives a message that is destined for a target frame directly or indirectly from a source frame.

FIG. 5 illustrates a flowchart of a method 500 for facilitating communication between frames of a browser window. The method 500 is initiated 500 whenever any particular frame of the browser window creates or receives a message that is destined for a target frame directly or indirectly from a source frame. For instance, applying FIG. 4E to the method 500 of FIG. 5, suppose that frame F1.1.1 is the source frame and frame 1.1 is a target frame for a particular message. The method 500 is initiated upon creating or receiving a message (initiating event 501).

The method 500 is first thus performed by the source frame F1.1.1, which is the "particular frame" in this first occurrence of method 500. It is then determined whether the particular frame F1.1.1 is the target frame (decision block 502). In this case, the particular frame F1.1.1 is not the target frame ("No" in decision block 502), and in response, the particular frame F1.1.1 determines whether the target frame F1.1 has registered with the particular frame (decision block 503). Referencing FIG. 4E, the particular frame F1.1.1 does not have any registration information for the target frame F1.1 ("No" in decision block 503) (as the particular frame F1.1.1 has no registration for any frame), and is it then determined whether or not the particular frame F1.1.1 has a parent frame (decision block 504). In this case, the particular frame F1.1.1 does have a parent frame ("Yes" in decision block 504), which is in fact frame F1.1. In response, the particular frame F1.1.1 passes the message to the parent frame F1.1 (act 505), triggering the parent frame F1.1 to perform the method 500 as the "particular frame".

The method 500 is then thus performed by the frame F1.1 as the particular frame. It is then determined that the particular frame F1.1 is the target frame (decision block 502). In this case, the particular frame F1.1 is the target frame ("Yes" in decision block 502). Accordingly, the particular frame F1.1 processes the message (act 506) as the proper recipient of the message.

A more complex example will now be described with respect to FIG. 4E and FIG. 5. In this example, frame F1.1.1 is a source frame, and frame F2 is a target frame. When frame F1.1.1 generates the message (initiating event 501), the frame F.1.1.1 performs the method 500 as the particular frame. Frame F1.1.1 then determines whether the particular frame F1.1.1 is the target frame (decision block 502). The particular frame F1.1.1 is not the target frame in this example ("No" in decision block 502), and in response, the particular frame F1.1.1 determines whether the target frame F2 has registered with the particular frame (decision block 503). The particular frame F1.1.1 does not have any registration information for the target frame F2 ("No" in decision block 503), and is it then determined that the particular frame F1.1.1 has a parent frame ("Yes" in decision block 504). In response, the particular frame F1.1.1 passes the message to the parent frame F1.1 (act 505), triggering the parent frame F1.1 to perform the method 500 as the "particular frame".

When frame F1.1 receives the message (initiating event 501) destined for the target frame F2 from the source frame F1.1.1, the frame F1.1 performs the method 500 as the particular frame. Frame F1.1 determines that the particular frame F1.1 is not the target frame ("No" in decision block 502), and in response, the particular frame F1.1 determines that the target frame F2 has not registered with the particular frame ("No" in decision block 503). Furthermore, since the particular frame F1.1 has a parent frame ("Yes" in decision block 504), the particular frame F1.1 passes the message to the parent frame F1 (act 505), triggering the parent frame F1 to perform the method 500 as the "particular frame".

When frame F1 receives the message (initiating event 501) destined for the target frame F2 indirectly from the source frame F1.1.1, the frame F1 performs the method 500 as the particular frame. Frame F1 determines that it is not the target frame ("No" in decision block 502). Thereafter, the particular frame F1 determines that the target frame F2 has not registered with the particular frame F1 ("No" in decision block 503). Furthermore, since the particular frame F1 has a parent frame ("Yes" in decision block 504), the particular frame F1 passes the message to the parent frame FX (act 505), triggering the parent frame FX to perform the method 500 as the "particular frame".

When frame FX receives the message (initiating event 501) destined for the target frame F2 indirectly from the source frame F1.1.1, the frame FX performs the method 500 as the particular frame. Frame FX determines that it is not the target frame ("No" in decision block 502). If, at this point, the frame FX determines that it does not have registration information for the target frame ("No" in decision block 503), then the message communication fails (act 507), since the particular frame FX does not have a parent frame ("No" in decision block 504). However, the particular frame FX does have registration information from the target frame F2 ("Yes" in decision block 503). For instance, in FIG. 4E, the registration information 421C in the frame FX includes the registration for the target frame F2. Accordingly, the particular frame FX uses a handle communicated as part of the registration to dispatch the message further towards the target frame (act 508). In this case, handle DOMWindowF2 is the handle of the target frame F2 itself.

When frame F2 receives the message (initiating event 501), the method 500 is performed by the frame F2 as the particular frame. The frame F2 then determines that it is the target frame ("Yes" in decision block 502). Accordingly, the particular frame F2 processes the message (act 506) as the proper recipient of the message.

Now suppose that frame F2 generates a message for transmission to the frame F1.1.1. In this case, the message is a response, with the source frame being frame F2, and with the target frame being frame F1.1.1. When frame F2 generates the message (initiating event 501), the frame F2 performs the method 500 as the particular frame. Frame F2 determines that the particular frame F2 is not the target frame ("No" in decision block 502), determines that the target frame F1.1.1 does not have any registration information for the particular frame F2 ("No" in decision block 503), determines that the particular frame F2 has a parent frame ("Yes" in decision block 504), and thus passes the message to the parent frame FX (act 505), triggering the parent frame FX to perform the method 500 as the "particular frame".

When frame FX receives the message (initiating event 501) destined for the target frame F1.1.1 from the source frame F2, the frame FX performs the method 500 as the particular frame. Frame FX determines that it is not the target frame ("No" in decision block 502), and determines that the frame FX does have registration information from the source frame F2 ("Yes" in decision block 503). For instance, in FIG. 4E, the registration information 423E in the frame FX includes the registration for the target frame F1.1.1. Accordingly, the particular frame FX uses a handle communicated as part of the registration to dispatch the message further towards the target frame (act 508). In this case, the registration information for target frame F1.1.1 (i.e., registration information 423E) includes handle DOMWindowF1, which is the handle of the frame F1 that provided the registration request to the frame FX on behalf of the target frame F1.1.1 Accordingly, the handle DOMWindowF1 would be used resulting in the particular frame FX dispatching the message to the frame F1.

When frame F1 receives the message (initiating event 501) destined for the target frame F1.1.1, the frame F1 performs the method 500 as the particular frame. Frame F1 determines that it is not the target frame ("No" in decision block 502). However, the target frame F1.1.1 has registered with the particular frame F1 ("Yes" in decision block 503). Accordingly, the particular frame F1 uses a handle communicated as part of the registration to dispatch the message further towards the target frame (act 508). In this case, the registration information held by the particular frame F1 for target frame F1.1.1 (i.e., registration information 422E) includes handle DOMWindowF1.1, which is the handle of the frame F1.1 that provided the registration request to the frame F1 on behalf of the target frame F1.1.1. Accordingly, the handle DOMWindowF1.1 would be used resulting in the particular frame F1 dispatching the message to the frame F1.1.

When frame F1.1 receives the message (initiating event 501) destined for the target frame F1.1.1, the frame F1.1 performs the method 500 as the particular frame. Frame F1.1 determines that the particular frame F1.1 is not the target frame ("No" in decision block 502). However, the target frame F1.1.1 has registered with the particular frame F1.1 ("Yes" in decision block 503). Accordingly, the particular frame F1.1 uses a handle communicated as part of the registration to dispatch the message further towards the target frame (act 508). In this case, the registration information held by the particular frame F1.1 for target frame F1.1.1 (i.e., registration information 421E) includes handle DOMWindowF1.1.1, which is the handle of the target frame F1.1.1 provided in its direct registration request to the frame F1.1. Accordingly, the handle DOMWindowF1.1.1 would be used resulting in the particular frame F1.1 dispatching the message to the frame F1.1.1.

When frame F1.1.1 receives the message (initiating event 501), the method 500 is performed by the frame F1.1.1 as the particular frame. The frame F1.1.1 then determines that it is the target frame ("Yes" in decision block 502). Accordingly, the particular frame F1.1.1 processes the message (act 506) as the proper recipient of the message.

Accordingly, a flexible mechanism for registering frames in a browser window has been described to create a frame hierarchy in such a manner that secure communication is possible between any frame of the browser window, even if those frames are in different security domains.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a particular frame of a browser window operating after being created, the method comprising:
   the particular frame acquiring a parent handle that is used to communicate with a parent frame of the particular frame, the parent handle being a handle of the particular frame if the particular frame is a root frame;
   the particular frame registering with the parent frame by providing registration information including a name of the particular frame, the particular frame registering with itself if the particular frame is the root frame;
   the particular frame responding to a registration request from a child frame of the particular frame, including:
      the particular frame recording a name of the child frame; and
      if the particular frame is not the root frame, the particular frame registering the name of the child frame with the parent frame in a manner that the handle of the particular frame is associated with the registration of the name of the child frame at the parent frame, and such that when the parent frame dispatches messages towards the child frame, the parent frame is enabled to dispatch the messages to the particular frame; and
   the particular frame responding to a message from a source frame, including the particular frame determining whether the particular frame is a target frame of the message, and, if the particular frame is not the target frame of the message, determining whether the target frame has registered with the particular frame, wherein:
      if the target frame has not registered with the particular frame, and if the particular frame is not the root frame, the particular frame passing the message to the parent frame; and
      if the target frame has registered with the particular frame, the particular frame using a handle communicated as part of the registration to dispatch the message further towards the target frame.

2. The method in accordance with claim 1, wherein the registration information provided by the particular frame also includes an origin of the particular frame that correlates to the name of the particular frame and that is used by the parent frame to verify future registration from the particular frame to the parent frame.

3. The method in accordance with claim 1, wherein the handle communicated as part of the registration is a handle of the target frame.

4. The method in accordance with claim 1, wherein the handle communicated as part of the registration is a handle of a frame to which target frame directly or indirectly registered.

5. The method in accordance with claim 1, further comprising, if the particular frame is the target frame, the particular frame processing the message.

6. The method in accordance with claim 1, wherein each of at least some of the particular frame, the source frame, and the target frame are loadable with content independent of the other frames of a browser window.

7. The method in accordance with claim 1, wherein if the target frame has not registered with the particular frame, and if the particular frame is the root frame, the particular frame determining that delivery of the message has failed.

8. A computing system comprising:
one or more processors;
a storage/memory hierarchy; and
a browser window construction mechanism for using the one or more processors to construct a representation of a browser window in the storage/memory hierarchy, the browser window including a hierarchy of frames;
wherein each of the frames is configured to facilitate communication between the frames of the browser window, including each of the frames being configured to perform at least the following:
acquire a parent handle that is used to communicate with a parent frame of said frame, the parent handle being a handle of said frame if said frame is a root frame;
register with the parent frame by providing registration information including a name of said frame, said frame registering with itself if said frame is the root frame;
respond to a registration request from a child frame of said frame, including:
recording a name of the child frame; and
if said frame is not the root frame, said frame registering the name of the child frame with the parent frame in a manner that the handle of said frame is associated with the registration of the name of the child frame at the parent frame, and such that when the parent frame dispatches messages towards the child frame, the parent frame is enabled to dispatch the messages to said frame; and
respond to a message from a source frame, including determining whether said frame is the target frame of the message, and, if said frame is not the target frame of the message, determining whether the target frame has registered with said frame, wherein:
if the target frame has not registered with said frame, and if said frame is not the root frame, passing the message to the parent frame; and
if the target frame has registered with said frame, using a handle communicated as part of the registration to dispatch the message further towards the target frame.

9. The system in accordance with claim 8, wherein if the handle communicated as part of the registration is a handle of the target frame, using the handle communicated as part of the registration to dispatch the message further towards the target frame comprises using the handle to dispatch the message to the target frame.

10. The system in accordance with claim 8, wherein if the handle communicated as part of the registration is a handle of a frame to which target frame directly or indirectly registered, using the handle communicated as part of the registration to dispatch the message further towards the target frame comprises using the handle to dispatch the message to a frame to which target frame is directly or indirectly registered.

11. The system in accordance with claim 8, wherein for each frame of the browser window, the said frame performs processing of the message if said frame is the target frame.

12. The system in accordance with claim 8, wherein each frame is configured to determine that delivery of the message has failed if the target frame has not registered with said frame, and if said frame is the root frame.

13. The system in accordance with claim 8, wherein each of at least some of the frames of the browser window are loadable with content independent of one or more other frames of the browser window.

14. A computer program product comprising one or more hardware storage devices having stored thereon computer-executable instruction that, when executed by one or more processors of a computer system, cause the computer system to perform at least the following for a particular frame of a browser window after the particular frame is created:
acquiring a parent handle that is used to communicate with a parent frame of the particular frame, the parent handle being a handle of the particular frame if the particular frame is a root frame;
registering with the parent frame by providing registration information including a name of the particular frame, the particular frame registering with itself if the particular frame is the root frame;
responding to a registration request from a child frame of the particular frame, including:
the particular frame recording a name of the child frame; and
if the particular frame is not the root frame, the particular frame registering the name of the child frame with the parent frame in a manner that the handle of the particular frame is associated with the registration of the name of the child frame at the parent frame, and such that when the parent frame dispatches messages towards the child frame, the parent frame is enabled to dispatch the messages to the particular frame; and
responding to a message from a source frame, including the particular frame determining whether the particular frame is a target frame of the message, and, if the particular frame is not the target frame of the message, determining whether the target frame has registered with the particular frame, wherein:
if the target frame has not registered with the particular frame, and if the particular frame is not the root frame, the particular frame passing the message to the parent frame; and
if the target frame has registered with the particular frame, the particular frame using a handle communicated as part of the registration to dispatch the message further towards the target frame.

15. The computer program product as recited claim 14, wherein the registration information provided by the particular frame also includes an origin of the particular frame that correlates to the name of the particular frame and that is used by the parent frame to verify future registration from the particular frame to the parent frame.

16. The computer program product as recited in claim 14, wherein each of at least some of the particular frame, the source frame, and the target frame are loadable with content independent of the other frames of a browser window.

17. The computer program product as recited in claim 14, wherein if the target frame has not registered with the particular frame, and if the particular frame is the root frame, the particular frame determines that delivery of the message has failed.

18. The computer program product as recited in claim 14, wherein if the handle communicated as part of the registration is a handle of the target frame, using the handle communicated as part of the registration to dispatch the message further towards the target frame comprises using the handle to dispatch the message to the target frame.

19. The computer program product as recited in claim 14, wherein if the handle communicated as part of the registration is a handle of a frame to which target frame directly or indirectly registered, using the handle communicated as part of the registration to dispatch the message further towards the target frame comprises using the handle to dispatch the message to a frame to which target frame is directly or indirectly registered.

20. The computer program product as recited in claim 14, wherein each frame is configured to determine that delivery of the message has failed if the target frame has not registered with said frame, and if said frame is the root frame.

* * * * *